United States Patent
Valadarsky

(10) Patent No.: US 8,160,106 B2
(45) Date of Patent: Apr. 17, 2012

(54) METHOD, DEVICE AND SYSTEM FOR TRANSMITTING ETHERNET PACKETS

(75) Inventor: Yoav Valadarsky, Kfar Sava (IL)

(73) Assignee: ECI Telecom Ltd., Petach Tikva (IL)

( * ) Notice: Subject to any disclaimer, the term of this patent is extended or adjusted under 35 U.S.C. 154(b) by 1197 days.

(21) Appl. No.: 11/142,377

(22) Filed: Jun. 2, 2005

(65) Prior Publication Data

US 2005/0271066 A1 Dec. 8, 2005

(30) Foreign Application Priority Data

Jun. 2, 2004 (IL) .................................... 162305

(51) Int. Cl.
*H04J 3/18* (2006.01)

(52) U.S. Cl. ........ 370/477; 370/471; 370/472; 370/473; 370/474; 370/521; 709/247; 455/72; 379/93.08

(58) Field of Classification Search .................. 370/468, 370/474, 475, 476, 477, 315, 52, 471–473; 379/88.1, 93.08; 709/247

See application file for complete search history.

(56) References Cited

U.S. PATENT DOCUMENTS

| | | | |
|---|---|---|---|
| 5,146,560 A | | 9/1992 | Goldberg et al. |
| 5,579,316 A * | | 11/1996 | Venters et al. ................ 370/392 |
| 5,850,526 A * | | 12/1998 | Chou ............................ 709/247 |
| 6,061,366 A | | 5/2000 | Seki et al. |
| 6,438,123 B1 * | | 8/2002 | Chapman ..................... 370/351 |
| 7,136,384 B1 * | | 11/2006 | Wang .......................... 370/395.1 |
| 2001/0014104 A1 * | | 8/2001 | Bottorff et al. .............. 370/471 |
| 2001/0048680 A1 * | | 12/2001 | Yoshimura et al. ........... 370/389 |
| 2002/0049861 A1 * | | 4/2002 | Bunn et al. ................... 709/247 |
| 2003/0233478 A1 * | | 12/2003 | Chuah et al. ................. 709/247 |
| 2004/0034708 A1 | | 2/2004 | Pelletier et al. |
| 2004/0068577 A1 * | | 4/2004 | Ruutu .......................... 709/236 |
| 2004/0076168 A1 * | | 4/2004 | Patenaude .................... 370/406 |

FOREIGN PATENT DOCUMENTS

| | | |
|---|---|---|
| EP | 1 424 831 A1 | 6/2004 |
| WO | WO 01/17314 A2 | 3/2001 |
| WO | WO01/17314 A2 * | 3/2001 |
| WO | WO 02/32034 A2 | 4/2002 |

OTHER PUBLICATIONS

Cisco, Understanding Ethernet over SONET Services over a Multiservice SONET/SDH Provisioning Platform (MSPP), Dec. 2003, Cisco.*

Simrex Corporation: Miniature Remote Ethernet Bridge—Installation and Operation Manual, Apr. 2004, pp. 1-10. XP000863883. [Online] http://www.simex.com/site/products/uBridge/uBridge%20 Manual%20rA.pdf.

(Continued)

*Primary Examiner* — Aung S Moe
*Assistant Examiner* — Hoon J Chung
(74) *Attorney, Agent, or Firm* — Browdy and Neimark, PLLC

(57) ABSTRACT

Technique for transmitting Ethernet packets from an Ethernet source point to an Ethernet destination point via a communication link, comprising compression of the packets in such a manner that the source point transmits complete Ethernet packets, the communication link carries shortened information blocks (SIB) obtained from said complete Ethernet packets, while the destination point receives complete Ethernet packets essentially identical to those transmitted from the source point.

14 Claims, 6 Drawing Sheets

OTHER PUBLICATIONS

"RFC 2507 (RFC2507)", IP Header Compression. Feb. 1999, [online], [retrieved May 19, 2005]. Retrieved from Internet <URL: ftp://ft.rfc-editor.org/in-notes/rfc2507.txt.

ITU-T Draft new Recommendation G.8012, Etherenet UNI and Ethernet NNI, pp. 1-28, May 2005.

ITU-T G.8011.1/Y.1307.1, Series G: Transmission Systems and Media Digital Systems and Networks, pp. 1-5, Aug. 2004.

Hong, Seung-Woo, "Developing new VPN services for hybrid Ethernet/TDM system", *Advanced Communication Technology*, The 6$^{th}$ International Conference on Phoenix Park, Korea, Piscataway, NJ, Feb. 9-11, 2004; vol. 2; pp. 709-713.

Ramamurti, Vish, et al., Initial Implementations of Point-to-Point Ethernet over SONET/SDH Transport, *IEEE Communications Magazine*, Piscataway, NJ, Mar. 2004, vol. 24, No. 3, pp. 64-70.

Lorchat, J. et al., "Energy Saving IEEE 802.11 Communications using Frame Aggregation", GLOBECOM'03, 2003 IEEE Global Telecommunications Conference, Dec. 1, 2003, pp. 1296-1300, vol. 3, IEEE, New York, NY.

* cited by examiner

METHOD, DEVICE AND SYSTEM FOR TRANSMITTING ETHERNET PACKETS

FIELD OF THE INVENTION

The invention relates to a technology of transmitting Ethernet packets with effective use of the available bandwidth.

BACKGROUND OF THE INVENTION

Growing cellular networks with millions of subscribers simultaneously hold a huge number of communication sessions which are often transmitted via mixed communication networks comprising both the cellular networks and various non-cellular networks.

IP (Internet Protocol) networks and Ethernet networks are digital communication networks that suit for the above purpose; they utilize digital packets of variable lengths capable of encapsulating data (such as contents of a communication session) for further transmission thereof in the network. The amount of real data (say, of the voice data) may form a tiny portion of a packet used for transporting the data. The packet can be IP in various modifications thereof, OSI, Ethernet, etc., but the problem remains the same.

In light of the above, the problem of compressing the lengthy packets becomes very actual to allow transmission of desired volumes of data, say originating from cellular networks, via non-cellular communications networks (for example, wireline, radio or any other non-cellular networks).

U.S. patent application 2004/0034708 describes a technology for fast Internet protocol headers compression initialization and also refers to a number of known methods of IP header compression (HC); the whole patent description is incorporated hereby by reference. A general approach to the IP packets compression by peeling and further restoring their headers is described in the detailed description with reference to FIG. 1. It should be noted that the mentioned compression/decompression of digital packets is specifically developed for a $3^{rd}$ layer protocol according to the Open System Interconnection (OSI) model for communication networks.

A standardized technique of IP headers compression (HC) is described in 2507 [RFC] and referred to in the US 2004/0034708.

For Ethernet networks utilizing lower layer communications protocols ($1^{st}$ layer and $2^{nd}$ layer) than the IP networks, no intrinsic compression/decompression technologies are presently known which would enable compression of Ethernet packets over an Ethernet link.

An Ethernet link is to be understood as a communication link between an Ethernet source node and an Ethernet destination node. It can be either a pure Ethernet link, or a combined communication link emulating the pure Ethernet link. One example of such an emulating link is a so-called Ethernet Private Line (EPL) according to (ITU G.8011, ITU G.8012) where the Ethernet source node and the Ethernet destination node are connected to one another via an intermediate non-Ethernet network portion of the OSI layer 1 or 2 by means of two Ethernet interfaces at the respective ends. The intermediate network portion may be, for example, a portion of the SONET/SDH network, a portion of a PDH network, an optical network, the media of the link may be a wire, an optical fiber (so-called dark fiber), radio or microwave. In the EPL, the Ethernet packets obtained from the source node are wholly mapped onto carrying blocks of the intermediate network, and then de-mapped from the carrying blocks to finally feed these Ethernet packets to the Ethernet destination node.

An Ethernet packet, in addition to its typical fields such as the payload and a number of Ethernet headers, comprises an upper layer data e.g., an IP packet incorporated in the payload, and also a number of IP headers.

According to standard Ethernet protocols (say, IEEE 802.3 and Ethernet II), the minimal length of the Ethernet packet is 64 bytes, while the real information to be transmitted by the packet may constitute some single bytes, for example in a case of voice data.

Some attempts have been made to perform compression of Ethernet packets, for example by introducing a pair of IP-compatible routers (such as Cisco router pair MWR 1900) into an Ethernet link formed between an Ethernet source node and an Ethernet destination node. A simplified block-diagram of such a solution is illustrated in FIG. 3. Owing to presence of the routers, the Ethernet packets can be peeled to drop the Ethernet headers thus obtaining IP packets, the IP packets can further be compressed utilizing the $3^{rd}$ layer protocol, similar to the principle described above with respect to IP networks. However, such a solution changes the logics of the network and its addressing system; it is therefore both complex and expensive.

SUMMARY OF THE INVENTION

It is therefore one of the objects of the present invention to provide a method/a device enabling compression of Ethernet packets in a communication link between an Ethernet source node and an Ethernet destination node, without expensive equipment, without changing the protocol supported by the source and destination nodes, and without affecting any address in the Ethernet packets (and of the IP and/or other information, if encapsulated in the Ethernet packets).

Other objects and aspects of the invention will be pointed out while the description proceeds.

The object can be achieved by providing a method of transmitting Ethernet packets from an Ethernet source point to an Ethernet destination point via a communication link, the method comprising compression of the packets in such a manner that the source point transmits complete Ethernet packets, the communication link carries shortened information blocks (SIB) obtained from said complete Ethernet packets, while the destination point receives complete Ethernet packets essentially identical to those transmitted from the source point.

The term "essentially identical" indicates that packets received at the destination point are such as if they have transparently passed from the source point to the destination point via an Ethernet communication link, without changes in the source and destination addresses.

More specifically, the method comprises
transmitting complete Ethernet packets from the source point according to a standard Ethernet protocol,
before launching to the communication link, compressing said complete Ethernet packets according to a compression/decompression procedure at the Ethernet layer, to obtain the SIB,
conveying the shortened information blocks (SIB) via the communication link using technology suitable for said communication link;
decompressing said shortened information blocks (SIB) based on said compression/decompression procedure,
receiving at the destination point decompressed Ethernet packets being essentially identical to the respective complete Ethernet packets transmitted from the source point; thereby allowing more effective use of the communication link's bandwidth.

The mentioned compression/decompression procedure comprises:
- at the step of compressing, dropping one or more fields of the complete Ethernet packets, upon determining a list and contents of said fields for further decompressing, thereby obtaining the shortened information blocks (SIB);
- at the step of decompressing, restoring of said dropped fields to obtain essentially the same the complete Ethernet packets from their respective shortened information blocks SIB.

The list and contents of the fields to be dropped/restored can be determined in various ways; some of them will be described in the specification.

Further, the compression/decompression procedure comprises dropping predefined (constant) and/or predictable (inferable) fields of a particular complete Ethernet packet according to a selected compression context, and adding an indication concerning the selected compression context to obtain a shortened information block of said complete Ethernet packet; said compression context being utilized at the step of decompressing for essentially restoring the compete Ethernet packets from said shortened information blocks (SIB).

In the simplest case, when the complete Ethernet packets to be compressed are of the same type, the compression may be performed according to a single pre-selected template. _ However, the method may comprise preliminarily selecting the template among various templates respectively corresponding to different types of the complete Ethernet packet. For example, different compression templates can respectively be built for Ethernet packets of the following types: PPP over Ethernet, MPLS over Ethernet, OSI over Ethernet, IP over Ethernet, etc.

Thereby the method may further comprise adding indication concerning the selected template, thus the shortened information block (SIB) includes both indication of the selected template and the compression context indication, to allow further restoration of the shortened information block SIB according to the selected template and to the selected compression context.

In view of the above, the method may further be detailed to include the following operations:
- preliminarily defining one or more compression templates of an Ethernet packet;
- at a compressing step, determining one of the compression templates, presently in use for an Ethernet packet;
- at a compressing step, determining a compression context ID for the compression template presently in use;
- providing information on the compression template and the compression context ID presently in use for the decompressing step;
- at the decompressing step, determining (learning, or retrieving) a compression context corresponding to the compression context ID;
- compressing further Ethernet packets according to the compression context ID and decompressing according to the determined compression context;
- periodically checking the compression template and the compression context ID; if remain the same, continuing the compressed transmission, if not—repeating the preceding operations for a newly determined compression template and/or a new compression context ID.

As mentioned, types of the compression templates are usually stated in advance. To determine the presently used template, the compressing unit may check a field Ethertype (sometimes, may also analyze some additional fields) of an incoming packet and thus to determine the template. Then, the packet is checked at one or more specific fields to determine a compression context ID. These specific_(key) fields indicate which portions in the packet will be constant, which inferable and which slightly changeable for the currently transmitted group of packets.

Indications of the compression context (context ID) and of the template are transmitted to the decompressing side (unit) with shortened information blocks, obtained from the complete Ethernet packets by dropping said specific fields at a transmitting side. During the process, complete Ethernet packets are occasionally sent between thus compressed ones.

The compression context is learned by storing the contents of the specific (key) fields at the decompressing side (unit) in association with the Context ID.

When the learning process is completed, the process continues so that the decompressing unit restores complete Ethernet packets from the received shortened information blocks, based on the context ID and the particular template.

Though the learning procedure, which is described above, is logically similar to the header compression (HC) techniques for IP headers, described in 2507 [RFC], it is executed at the Ethernet layer and is applicable for compressing Ethernet packets which have previously been considered unsuitable for compression. The proposed procedure also introduces a novel option of using various compression templates.

The proposed compression procedure is performed at the Ethernet layer and, though processing the standard Ethernet packets, does not relate to a standard Ethernet protocol. The procedure does not affect the source and the destination addresses, and the contents of the finally received Ethernet packet. It becomes possible owing to the fact that the compression/decompression procedure is started and finalized between the compressing point and the decompressing point, so that the source point and the destination point "do not feel" presence of any elements/operations in the communication link.

The standard Ethernet protocol should be understood as an Ethernet layer 1 packet format or a layer 2 Ethernet protocol, for example the protocol described in the IEEE standards 802.3 and 802.1.

The communication link for transmitting the SIB according to the invention may be an Ethernet media or an emulated Ethernet link.

The emulated Ethernet link may, for example, be in the form of an Ethernet Private Line (EPL) comprising an intermediate section of a layer 1 network or layer 2 network. It can be a network using a TDM transmitting technology, such as a radio PDH (Plesiochronous Digital Hierarchy) network, an SDH/SONET (Synchronous Digital Hierarchy) network; in one simple case, it can be just an optical fiber connection. Another example of emulation of the Ethernet link is an Ethernet Virtual Private Line (EVPL) implemented over an Ethernet cloud or an MPLS cloud.

To enable transmitting the shortened information blocks via the communication link, the method includes an operation of mapping said blocks obtained upon said compressing, onto the communication link, and further an operation of de-mapping said blocks for de-compressing.

Mapping of the shortened information blocks may be performed in many ways. For example, it can be performed according to a Request for Comments (RFC) 3153 for PPP multiplexing, according to a GFP protocol (G.7041), or even according to any Ethernet protocol in case of an Ethernet media.

All the above-mentioned protocols define suitable headers (envelopes) to be added for transmitting data over a communication link.

Other suitable standardized mapping methods, as well as any proprietary methods can be used.

Preferably, additional steps are performed in the method, for reducing length of packets obtained while mapping, to compensate impact of the mapping on the compression result.

According to the most preferred embodiment of the invention, the mapping is performed by combining (multiplexing) a number of the shortened information blocks (SIB) within a common envelope.

As a result, the "per-packet" mapping overhead is reduced.

In one version of such a mapping, it is executed by multiplexing a number of the shortened information blocks (SIB) into a common GFP envelope.

In another version of the mapping, it is executed by multiplexing a number of the shortened information blocks (SIB) into a common Ethernet envelope.

Other rationalized mapping techniques are possible, for example by multiplexing a number of the shortened information blocks (SIB) into a common MPLS envelope.

Though such techniques are currently non-standard (proprietary), they can be used without any harm to the source and destination of the Ethernet link since they are started and terminated in the intermediate portion of the link.

To implement the proposed operations, the method may further comprise:
  inserting a packet compressing means between the source point and the communication link, allowing communication between said source point and said packet compressing means using a first standard Ethernet interface and performing compression of the complete Ethernet packets to obtain the shortened information blocks,
  inserting a packet decompressing means between the communication link and the destination point, allowing decompression of the shortened information blocks and communication between said packet decompressing means and said destination point using a second standard Ethernet interface,
  conveying the shortened information blocks via the communication link from the compressing means to the decompressing means.

Further, the step of arranging the transmission comprises providing mapping means at the side of the compressing means, and providing de-mapping means at the side of the decompressing means.

In practice, the method implies performing thereof selectively, wherever desired and/or required (say, only at such links in a network, which require freeing some spare bandwidth).

According to another aspect of the invention, there is also proposed a device for compressing/decompressing Ethernet packets, the device comprising a compression means and/or decompression means, each of said means having an input side and an output side and being operative:
  to handle complete Ethernet packets according to a standard Ethernet protocol at one of its two sides, and
  to handle shortened information blocks (SIB) at another of its two sides, according to a compression/decompression procedure at the Ethernet layer different from the standard Ethernet protocol, wherein said SIB are portions of said complete Ethernet packets.

Preferably, said device is bi-directional, and is adapted for compressing and decompressing Ethernet packets to be transmitted in two opposite directions via a communication link between an Ethernet source point and an Ethernet destination point both operating according to the standard Ethernet protocol. Such a device comprises both said compressing means and said decompressing means, operating according to the compression/decompression procedure. The compressing means is adapted to communicate, directly or indirectly, with the source point and the communication link; the decompressing means is adapted to communicate, directly or indirectly, with the communication link and the destination point.

The compressing means is capable of dropping constant and/or predictable fields of the complete Ethernet packets, thereby obtaining shortened information blocks to be transmitted via the communication link, and said decompressing means is capable of performing exact restoration of said fields to obtain the complete Ethernet packets from the respective shortened information blocks received from the communication link.

The compressing means and the decompressing means are to be provided with a respective processing unit and with a memory, for operating according to said compression/decompression procedure.

The device is preferably in the form of a card (Ethernet Compression Card) which can be installed at the point of launching/receiving the communication traffic to/from the communication link.

According to a further aspect of the invention, there is proposed a system for transmission of Ethernet packets via a communication link, the system comprises an Ethernet source point and an Ethernet destination point both operating according to a standard Ethernet protocol and connected via the communication link, the system further comprises: a compressing means and a decompressing means both operative according to a procedure at the Ethernet layer being different from the standard Ethernet protocol,
the compressing means is connectable to be in direct or indirect communication with the source point and the communication link and is capable of producing shortened information blocks (SIB) from the Ethernet packets, while the decompressing means is connectable to be in direct or indirect communication with the communication link and the destination point, and is capable of restoring said Ethernet packets from said SIB.

The communication link may constitute an Ethernet media or an emulated Ethernet link, for example an EPL comprising the Ethernet source point and the Ethernet destination point communicating via an intermediate section of a network of layers 1, 2. The intermediate network section may allow communication utilizing a TDM technology (PDH/SDH/SONET), or comprise optical fibers. Another example of an emulated Ethernet link is an Ethernet Virtual Private Line (EVPL) implemented over an Ethernet cloud or an MPLS cloud.

The system further comprises a mapping means connectable between the compression means and the communication link, and also comprises a de-mapping means connectable between the communication link and the decompressing means.

Preferably, the mapping means is capable of performing multiplexing of the shortened information blocks SIB within one common envelope according to a communication protocol utilized at said communication link.

The mapping multiplexing technology can be performed either according to standardized techniques (such as the PPP multiplexing, according to RFC 3153), or according to non-standard techniques such as those proposed below.

Preferred examples of such a non-standard technique for the mapping means can be modified Ethernet, GFP or MPLS protocols, which would enable multiplexing of shortened information blocks SIB into a common Ethernet, GFP or MPLS envelope, respectively.

Alternatively, the mapping means may perform mapping of single information blocks into standard envelopes, or using any other proprietary (non-standard) mapping methods.

Preferably, the compression means and the mapping means are integrally incorporated in one network node.

Also preferably, the decompression means and the de-mapping means are integral within one network node.

For cases of full-duplex transmission, such a network node comprises both the compressing means and the decompressing means, and also the mapping means and the de-mapping means, preferably in a combined Ethernet compression card.

For a case of broadcasting (a point to multi-point model), one node at the transmitting side may comprise only the compressing means coupled with the mapping means, and nodes at the receiving side may comprise only a suitable de-mapping means and a suitable decompression means.

Other embodiments of the system, of the network nodes and examples of the procedure intended for compression/decompression and mapping/de-mapping can be proposed, part of them will be described in the detailed description which follows.

The proposed concept of the new technology has two main features, which respectively and together bring two highly important advantages:

a) essentially greater amounts of information can be transmitted via the communication link due to the possibility of compression, while b) The Ethernet compression procedure is transparent both for the source and the destination since it does not require performing any change at the source and at the destination.

To appreciate both the first and the second mentioned advantage, one should compare the proposed technology, for example with the presently accepted compressing technology at the IP layer described in the Background.

In short, the newly proposed technology allows compression of standard Ethernet packets without expensive equipment and without any logical changes in the source and the destination, since the packets transmitted at the source point and the packets received at the destination point remain in the form as if there were nothing more than a wire between the source and the destination.

In view of the above, the intrinsic features of the technology render it cost effective. One of the preferred applications of the technology will be for transmitting cellular subscribers' sessions to their fixed destinations via existing Ethernet networks, the solution which will result in the maximally effective use of the Ethernet network's bandwidth at almost a negligible cost.

Other aspects and details of the invention will be further described with reference to the drawings which follow.

BRIEF DESCRIPTION OF THE DRAWINGS

The invention will be described below with the aid of the attached non-limiting drawings in which.

DETAILED DESCRIPTION OF THE INVENTION

Figure 1:
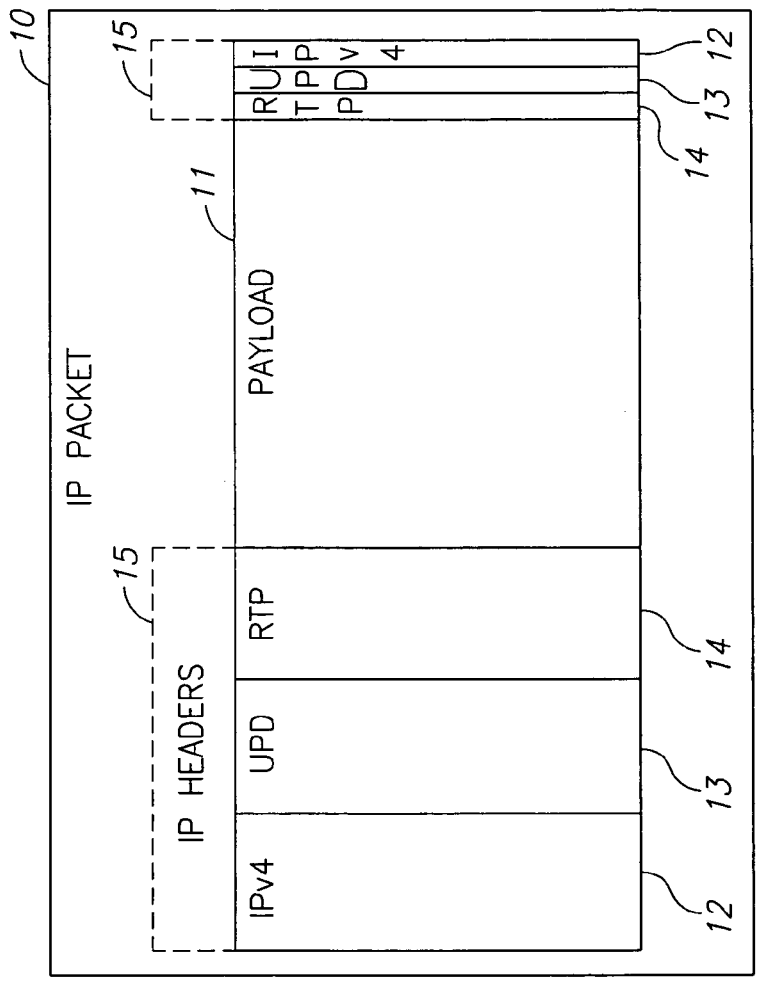
FIG. 1 (prior art) illustrates an exemplary structure of a standard IP packet

FIG. 1 (prior art) is a copy of FIG. 1 of US 2004/0034708 A1. Various types of Internet Protocols (IP) nowadays become applicable over all kinds of network links. IP usually refer to numerous packet switching protocols such as IPv4 (Internet protocol version 4), IPv6 (Internet protocol version 6), UDP (User Datagram Protocol), UDP-Lite, TCP (Transport Control Protocol), RTP (Real-time Protocol), etc. An IP packet is usually composed of a payload of information sequentially encapsulated in one or more IP protocols.

An exemplary IP packet 10 is shown in FIG. 1 and can be formed by a payload 11, a RTP header 14, a UDP header 13 and an IPv4 header 12. The IP packet 10 is referred to as an IPv4/UDP/RTP packet. For simplicity purposes, the headers 12, 13 and 14 are usually jointly referred to as IP headers 15. Other sets and subsets of IP protocols each having different header configurations can be used to form the IP packet 10 and the IP headers 15. Each header 12, 13 and 14 of the IP headers 15 carries specific information about the IP packet 100, which information is used by the destination of the packet 10 to interpret the payload 11. The carried information in the IP headers may include origination and destination of the IP packet 10, associated quality of service information, a sequence number, checksum information for integrity of the payload, etc. One drawback of IP is the large size of the IP headers. It is not a simple task to make use of IP over narrow band network links as, for example, cellular links. As an example, using the IP protocols for ordinary speech data (e.g. Voice-over-IP or VoIP using IPv4/UPD/RTP or IPv6/UPD/RTP) may represent a loss of as much as 70% of the bandwidth capacity of a given network link.

The term header compression (HC) comprises the art of minimizing the necessary bandwidth used by the IP headers. It is usually performed on a per-hop basis over point-to-point network links. Header compression techniques, in general, have a more than ten-year-old history within the Internet community. Header compression takes advantage of the fact that some fields in the IP header are not changing (static) within a stream of packet pertaining to a given packet flow, or change with small or predictable values. Header compression techniques make use of these characteristics and send static information only initially, while changing fields are sent with their absolute values or as differences from packet to packet. Completely random information has to be sent without any compression at all. The task of any header compression technique is to keep both ends of the network link consistent with each other. For that purpose, a compressor at one end and a decompressor at the other end each make use of a decompression context. The use of the decompression contexts aims at keeping the IP headers size as low as possible. To do so, each end manages all necessary information to eliminate some fields (totally or partially) from the IP headers at the compressor end and to rebuild the IP headers at the decompressor end.

Figure 2:
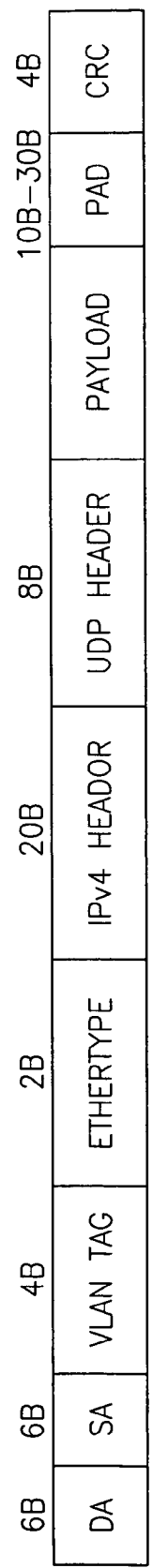
FIG. 2 (prior art) illustrates an exemplary structure of an Ethernet packet to be compressed according to the invention.

FIG. 2 (prior art) schematically illustrates an exemplary standard Ethernet packet. In this example, the Ethernet packet (16), in addition to its typical fields such as the payload and a number of Ethernet headers, comprises an upper layer data e.g., an IP packet incorporated in the payload, and also a number of IP headers. It should be noted that the IP over Ethernet packet is considered as an example only, and other types of Ethernet packets may exist (PPP over Ethernet, MPLS over Ethernet, OSI over Ethernet); such other packets can be distinguished by analyzing, for example, the field "Ethertype".

According to standard Ethernet protocols (say, IEEE 802.3 and Ethernet II), the minimal length of the Ethernet packet is 64 bytes, while the real information to be transmitted by the packet may constitute some single bytes, for example in a case of voice data.

Let a succession of complete Ethernet packets belonging to one and the same type (say, during one and the same communication session) are transmitted from a source node and received at a destination node.

It has been analyzed and noted by the Inventor that during one and the same communication session, many fields in the packets of the succession will remain the same or will be otherwise predictable.

Such repeating fields are the Ethernet headers of the packet, such as DA, SA, VLAN Tag, Ethertype and the internal IP headers such as Ipv4 Header, UDP Header.

It has also been noted by the Invention that the field of CRC and the field of Pad (Padding) are predictable, so the only really changeable field during one communication session is the Payload which carries information to be transmitted to the destination. It should be noted, however, that even in the payload there may be constant fields which could be dropped according to the newly proposed method. The proposed concept of compressing Ethernet packets, utilizing the features of such packets, will be described with reference to FIGS. 5 and 6.

Figure 3:
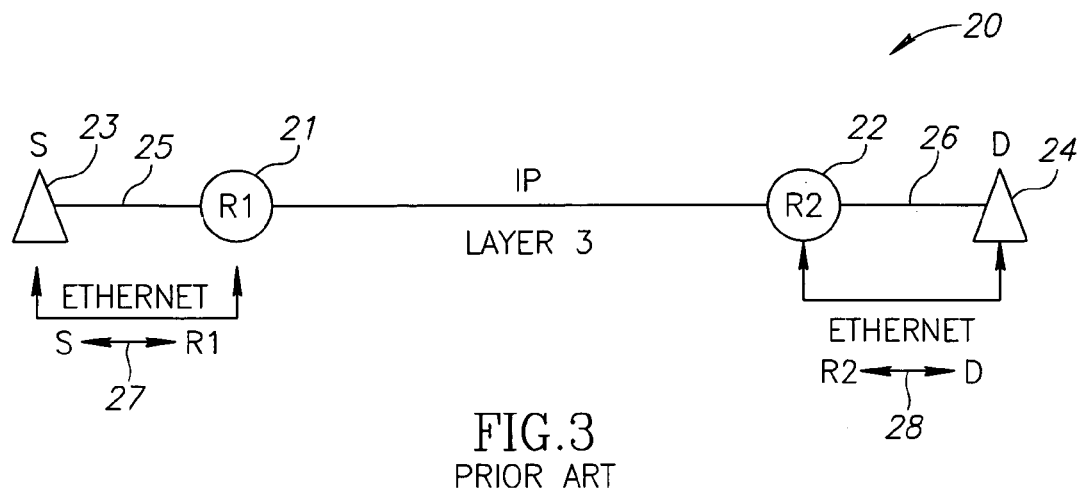
FIG. 3 (prior art) illustrates a block diagram of a known solution for compression packets in an Ethernet link.

FIG. 3 (prior art) illustrates a known solution being an attempt to perform compression of Ethernet packets, by introducing a pair of IP routers 20 21, 22 (such as Cisco router pair MWR 1900) into an Ethernet link 20 formed between an Ethernet source node (say, comprising a base transmission controller BSC 23) and an Ethernet destination node (comprising a base transmission station BTS 24). The routers 21, 22 respectively communicate with the Ethernet source node 23 and the Ethernet destination node 24 via standard Ethernet interfaces (25, 26), thus the Ethernet source node and the Ethernet destination node do not speak with one another directly. The routers 21, 22 communicate with one another using the IP logics. The Ethernet packets from the source node (S) 23 are addressed to the first router (R1) 21 and thus have suitable Ethernet headers (for the usual bi-directional transmission, such headers are symbolized by a bi-directional arrow 27 "from S to R1 or from R1 to S"). At the first router R1 21, the packets are peeled to drop the Ethernet headers thus obtaining IP packets, the IP packets can further be compressed utilizing the $3^{rd}$ layer protocol, similar to the principle described with respect to IP networks and with reference to FIG. 1. When arriving to the second router R2 22, the compressed IP packet is to be equipped with new Ethernet headers, which would allow forwarding the restored Ethernet packets from the second router R2 to the Ethernet destination node D (the new header is symbolized by a bi-directional arrow 28 between R2 and D). It should be noted that the restored Ethernet packets arriving to the destination node are not identical to the original Ethernet packets launched from the source node: their headers differ since they travel through intermediate routers. Owing to presence of the routers, the described solution is both complex and expensive.

Figure 4:
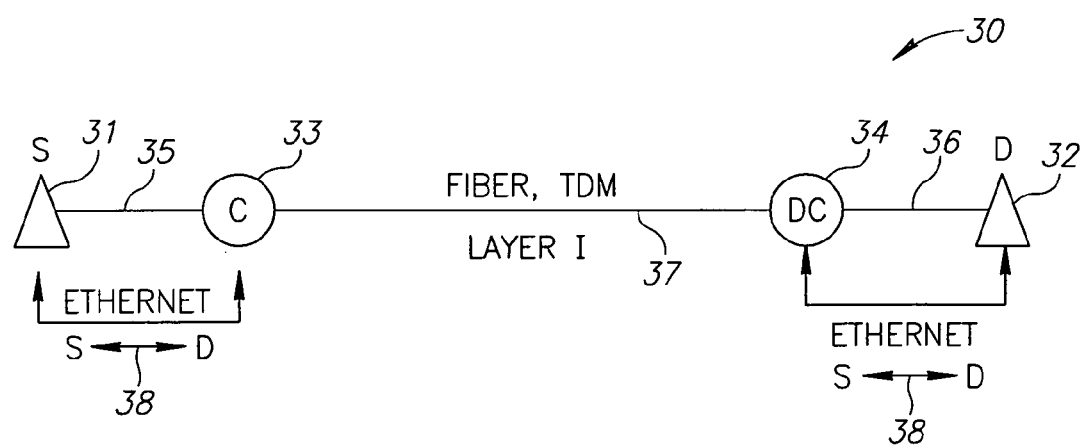
FIG. 4 is a schematic block-diagram illustrating an example of the proposed technology for compressing Ethernet packets over an Ethernet emulation point-to point link.

FIG. 4 is a simplified diagram showing one basic embodiment of the proposed system and method. The emulated Ethernet link 30 is formed between an Ethernet source node (S) 31 and an Ethernet destination node (D) 32. Though the S and D nodes are shown as base stations, they may constitute other communication nodes. At the side of the source node 31, there is situated a compression means (C) 33, preferably in the form of a hardware/software card incorporated in a separate network node also marked 33 and communicating with the source node 31 via a standard Ethernet interface 35. Similarly, at the side of the destination node 32, there is provided a de-compression means (DC) 34 in a separate node also marked 34, communicating with the node 32 via a standard Ethernet interface 36.

The Ethernet link comprises an intermediate network section or a communication link 37 of an optical network, a TDM network such as SDH/SONET or PDH; nodes 31 and 32 are connected to this section via the nodes 33, 34.

The nodes 33, 34 communicate with each other over the network section 37 that should transmit there-between the shortened information blocks. To perform that, the information blocks are mapped into frames or other carrying blocks of the intermediate network (mapping means are preferably located at the nodes 33 and 34, though are not shown in this drawing).

The context (principle) of compression used at the compressor 33 is symmetric to the context of decompression used at the de-compressor 34, namely: portions of Ethernet packets received from the source node S and dropped at the compressor 33 are exactly restored at the de-compressor 34, so the packets received at the destination node D are exactly the same which were sent from the source node (see the identical bi-directional arrows 38). The source S and the destination D of the Ethernet link 30 "do not feel" existence of any compression there-between since the compression/decompression procedure is performed at the Ethernet layer (with the Ethernet packets as are).

Figure 5:
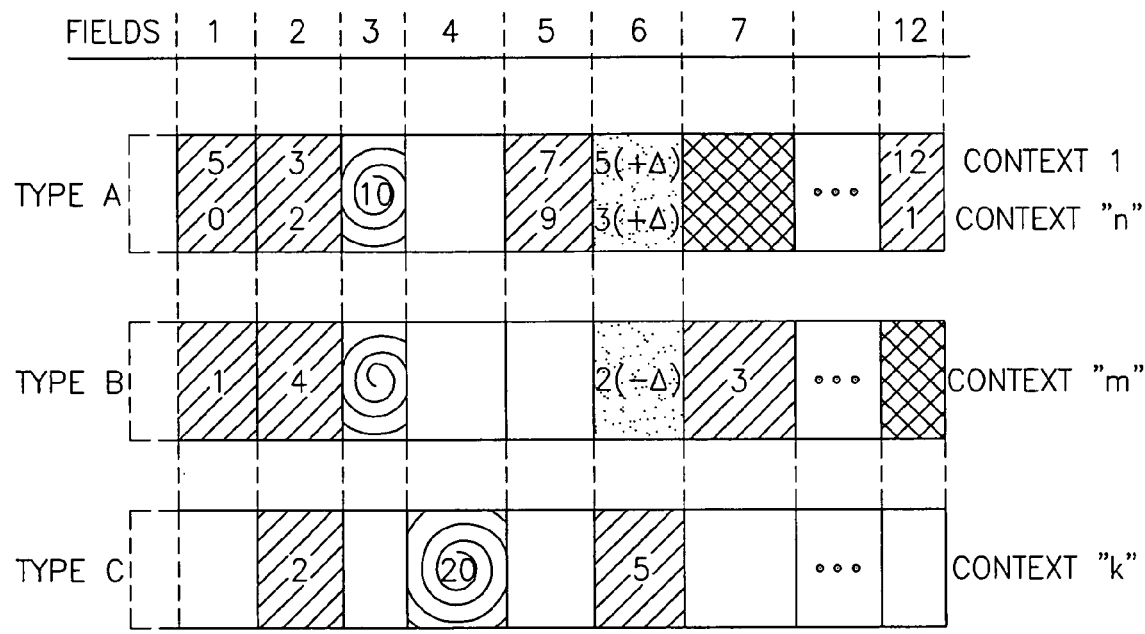
FIG. 5—is a schematic diagram illustrating a number of preliminarily prepared templates according to which compression of Ethernet packets of various types can be performed at the compressing means.

FIG. 5 schematically illustrates a number of templates and a number of compression contexts, the terms which are implemented in the compression/decompression procedure.

Let the compression means is capable of recognizing different types of Ethernet packets arriving to it from the Ethernet source. As has been mentioned, it can be performed by analyzing the field "Ethertype" (see FIG. 2) of the incoming Ethernet packet, and sometimes by analyzing additional fields in the packet.

Let, for example, the network management system (NMS) informs the compression means and the decompression means (in parallel and in advance) about three templates A, B, C respectively corresponding to three possible types of Ethernet packets. In this drawing, we do not refer to any particular real type of the Ethernet packet, but will explain the principle of using templates for the Ethernet packets compression. (It should be kept in mind that the compression/ decompression means can be designed for a single type of Ethernet packets and thus will comprise only one template in standby).

Whenever the type of the Ethernet packet is identified, the corresponding type of template is automatically defined (selected). The field(s) upon which the templates are distinguished, are schematically shown at the beginning of the frame, in dotted lines. The templates A,B,C are schematically divided into 12+1 fields (in general, they can be fields belonging to various headers as well as fields belonging to the payload). These fields are marked by various types of shading; the shading types have different meanings. The number and location of fields in different templates may be different.

The packet may comprise one or more predictable fields, for example:
field(s) being constant for this template (marked with a spiral shading in the drawing),
fields being constant for this specific context (fields with a diagonal shading)
field(s) that can be inferred (are derivable) from other values (marked with a double diagonal shading).

The packet may comprise field(s) changeable, say, during a communication session, just with time or with any conditions. For example such fields may be:
field(s) slightly changing during the communication session (marked with a dotted shading in the drawing),
fields(s) randomly changing during the communication session (the fields are blank).

The term "fields" should be understood as portions of the headers as well as portions of the payloads of the packets to be compressed.

In the compression procedure, the constant fields, the fields which can be inferred, and the slightly changing fields can be dropped with different conditions (contexts) for their restoration which will be discussed below. The randomly changing fields are usually transmitted as are, without compression.

Upon detecting the template, the compression means checks other critical fields or key fields for the selected template (say, having some specific shading in the drawing) and, according to their contents, recognizes the known compression Context ID or detects a new compression Context ID.

These specific (key) fields can be IP source, IP destination, UDP source/destination ports. For another template suitable for MPLS over Ethernet packets, these fields can be label information fields taken alone or in combination with the UDP/IP ports information. As mentioned before, the template type means which fields of the packet are constant, which are inferable and which are slightly changeable for the currently transmitted group of packets (session).

Within the template of type A in FIG. 5, there are shown two rows with different possible contents, which are associated in the compressing means with two different Context IDs: Context 1 and Context "n". The processor of the compressing means should store the pattern of any actual compression context.

In order to inform the decompressing means about the compression context (t.e., the contents of the marked fields in the selected template), at least one copy of these fields corresponding to the detected type A should be sent (preferably, in a complete Ethernet packet) to the decompressing means, including indication of the context ID. At the decompression means, the type of template may be detected either automatically, or be received as appended/included in the context ID indication. The decompression means will thus associate the contents of the key fields in the selected template with their contents and with the received context ID.

Under the context ID (and optionally, the type of template), the processor of the decompression means will: store contents of the constant fields, calculate contents of the inferred fields, store the current value of the changeable fields to be ready for updating it whenever a change (Δ) is received. Therefore, the scheme depicted in FIG. 5 finally applies to both the compressing means and the decompressing means.

When the compressing means starts sending compressed Ethernet packets (i.e., shortened information blocks where the constant fields, inferable fields and slightly changing fields are dropped), the decompressing means will be capable of restoring these fields based on the compression context stored under the type of template and the Context ID.

Figure 6:
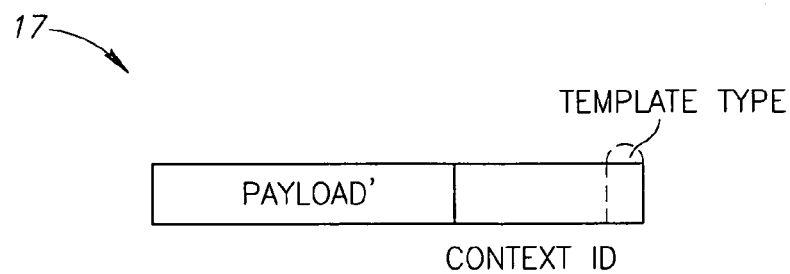
FIG. 6 illustrates an exemplary structure of a shortened information block obtained upon compressing a standard Ethernet packet according to the proposed technique.

FIG. 6 should be considered in conjunction with an example 16 of standard Ethernet packet illustrated in FIG. 2, and one of the templates illustrated in FIG. 5. FIG. 6 illustrates a shortened information block SIB (17) comprising a modified payload (Payload') comprising randomly changing fields of the packet, and a field "Context ID". The Payload' usually comprises at least a portion of the initial payload, and may also comprise additional randomly changing fields of the Ethernet packet.

Any standard Ethernet packet comprises a number of headers belonging to various layers of transmission protocols. Most of the headers remain constant or are predictable during a particular communication session. Knowing a pre-determined template for the session, the packet fields corresponding to specific predictable headers are dropped at the compression means and, since the same predetermined template is known to the de-compression means, the dropped fields will be restored in the restored Ethernet packet.

The contents of the restored fields will be filled in accordance with a specific data (context ID) about the compression context.

The context ID always carries a coded data about contents of the dropped fields. Say, context "1" or context "3", wherein each of them is a message to the decompression means to calculate and/or fill specific contents in the restored fields; remember that the fields to be restored are known from the selected template. Optionally, if the compression means is operative to work with a number of possible templates, an additional coded data indicating the specific selected template can be incorporated in the context ID.

Figure 7A:
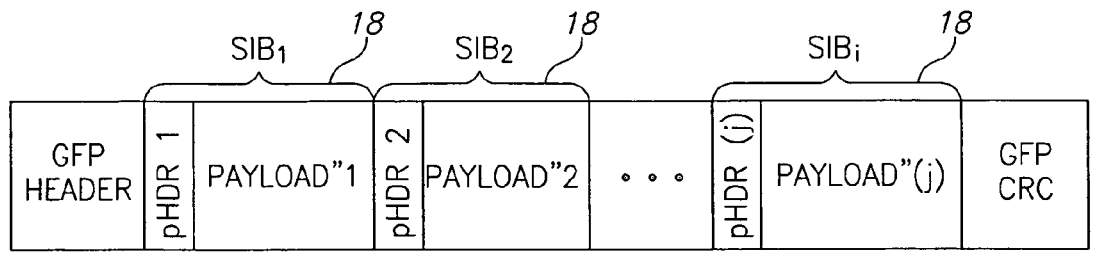
FIG. 7a illustrates one example of a mapping procedure for transmitting a number of shortened information blocks, being compressed Ethernet packets, into one GFP packet.

FIG. 7a illustrates one example of mapping a number of shortened information blocks, obtained upon compression, into a common GFP packet thereby performing so-called GFP multiplexing. Though a plain GFP mapping is known for TDM networks (such as SONET/SDH, PDH) the proposed technique of GFP multiplexing has never been applied before for effective transmission of information via TDM networks. FIG. 7a shows a GFP packet having a standard GFP header, and a standard GFP trailer (CRC portion). The internal portion of the standard GFP packet is filled with "j" shortened information blocks (SIB). In this particular example, each of the SIB blocks 18 comprises its payload portion marked Payload" and is provided with its individual header (pHdr1, 2, . . . j) for separating thereof from the neighbor SIB. The individual header of an SIB may comprise the following information in predetermined specified fields: indication of the packet's type, indication of length of the SIB, the context ID, a Generation field (as part of Context ID) and other data. The Payload" of SIB comprises the random payload portion of the compressed Ethernet packet and random non-payload fields of the Ethernet packet (if any), which are transmitted as is. It should be noted that the Payload in FIG. 2 must not be equal to the Payload' of FIG. 6 and they both are usually not equal to the Payload" of FIGS. 7a-7c.

Figure 7B:
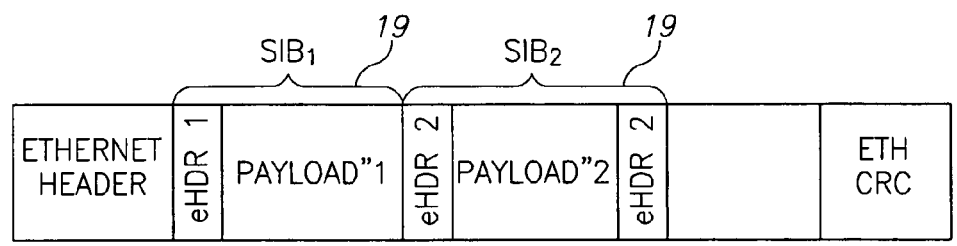
FIG. 7b illustrates another example of mapping, where a number of shortened information blocks are arranged into one Ethernet packet.

FIG. 7b illustrates how a number of shortened information blocks obtained upon compressing of Ethernet packets can be mapped (multiplexing) into a transport Ethernet packet. Like the GFP multiplexing, the Ethernet multiplexing has not been described before in the prior art.

The field of Ethernet header will comprise, as usually, destination address DA, source address SA, VLAN tag, and Ethertype which in this case should be special, to indicate the fact that the packet comprises a number of separate payload portions. These separate payload portions are shortened information blocks (SIBs) 19, and each is accompanied with its individual header, similar to those illustrated in FIG. 7a and carrying similar information concerning contents of SIB. The individual headers of the multiplexed Ethernet packet are marked "eHDR". The common Ethernet packet is terminated by the Ethernet CRC field.

Figure 7C:
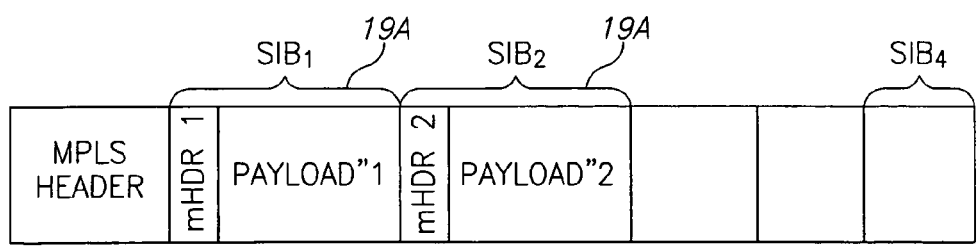
FIG. 7c shows yet another example of mapping a plurality of shortened information blocks into a common MPLS packet.

FIG. 7c illustrates a further possibility to map shortened information blocks after compressing Ethernet packets. These blocks may be enveloped into an MPLS packet; its header will comprise one or more MPLS labels defining the path of the packet's transmission. The SIBs 19A are coupled to and separated by individual headers mHDR similar to those described with reference to FIG. 7a.

Figure 8:
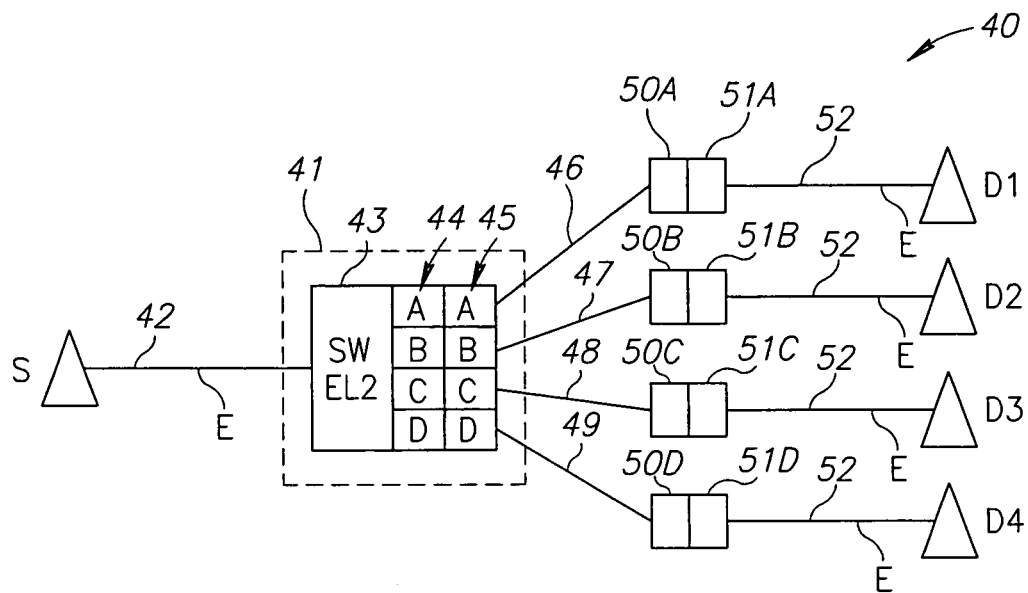
FIG. 8 illustrates an example of the system according to the invention, serving for a point-to-multi point application.

FIG. 8 shows one embodiment 40 of a system for compressing Ethernet packets. One source S of Ethernet packets communicates via an intermediate node (41) with four destinations D1-D4. The source S and the intermediate node 41 communicate using a standard Ethernet protocol via the interface 42. The node 41 comprises a switch (bridge) at Ethernet layer 2(EL2) responsible for distributing packets sent from the source S to four suitable portions of the node 41, according to the destination addresses in the Ethernet packets. The four suitable portions of the node are formed by respective pairs of compressing blocks and mapping blocks.

Compressing means 44 is logically divided into four blocks (ports a, b, c, d) corresponding to four end devices D1-D4. The compressing means 44 preferably has one principle of operation, but is divided into four logical blocks corresponding to four destinations.

The node 41 comprises four different mapping blocks 45A-D, each of the blocks is capable of mapping the compressed information blocks into carrying frames suitable to a specific transmission line between the node 41 and the specific destination.

It should be mentioned, that the four lines 46-49 may belong to different networks (SDH/SONET, fiber, PDH) and therefore may require different ways of mapping. For example, a GFP multiplexing mapping can be utilized.

Each of the lines is equipped with its specific de-mapping device 50A, 50B, 50C, 50D which are respectively coordinated with the suitable mappers 45A-D; all of the lines are also provided with similar de-compression devices 51A, 51B, 51C, 51D corresponding to the compressing means 44. Upon de-compressing, the signals are fed to the destination points D1-D4 via the local Ethernet interfaces (schematically marked 52).

Figure 9:
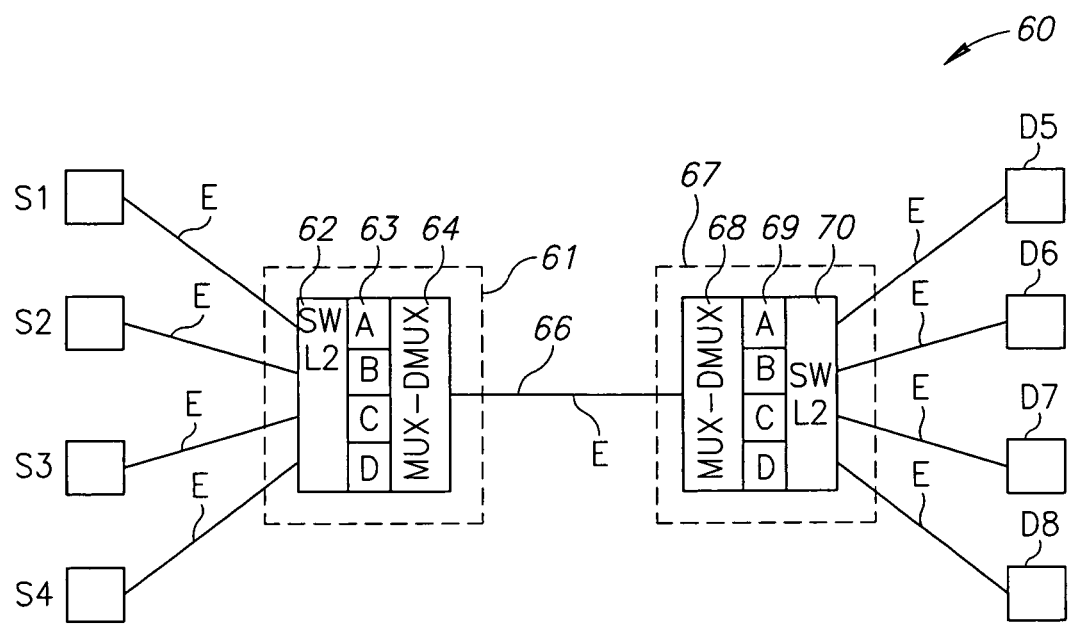
FIG. 9 illustrates an embodiment of the system for compressing Ethernet packets according to the invention, for a multi-point to point or multi-point to multi-point application.

FIG. 9 illustrates a further example of an Ethernet link adapted for Ethernet packets compression. The system 60 is designed for multi-point to multi-point transmission. It may also work for a multi-point-to-point transmission.

The drawing illustrates implementation of a newly proposed idea of the mapping by multiplexing a number of shortened information blocks into a common Ethernet packet. Let us first consider the multi-point to multi-point case.

Ethernet packets arrive from Ethernet sources S1-S4 and via separate Ethernet interfaces to a node 61. The node 61 comprises an Ethernet layer 2 switch 62 which connects the received packet streams to a compressing block 63 which can be represented by four compressing sub-blocks 63A-D, where the packets are compressed. The principle of compressing at blocks 63A-D may (and may not) be the same, though these blocks are logically separated. The compressed packets are further multiplexed and mapped by a MUX-DMUX-mapper 64 into a standard Ethernet packet, for transmitting via the Ethernet link 66.

One may note that instead of transmitting several (in this case, four) standard Ethernet packets over the link 66, we compressed the traffic into much less (in this case, one) standard Ethernet packet.

Since the obtained Ethernet packet is a standard Ethernet packet, the link 66 can be realized by a layer 2 cloud (comprised of Ethernet switches and bridges).

The combined Ethernet packet upon passing via the communication link 66 is received at a node 67 by a demapper-DMUX-MUX 68, where the payload of the received Ethernet packet is extracted and decomposed into the information blocks (as issued from the compression means 63A-D). The information blocks are fed to a decompressing block 69 (a group of decompressing blocks 69A-D), and, upon being restored as complete Ethernet packets, are distributed by an Ethernet layer 2 switch 70 towards suitable destinations D5-D8, according to the address information in the packets. The de-compressing blocks 69A-D are respectively cooperative with the compressors 63A-D, though contexts of the compression/decompression of adjacent lines may differ from one another.

Each one of the blocks 63 and 69 can be implemented as a single block, which can be interconnected with its respective layer 2 switch (62, 70) via a single internal Ethernet interface. In the case of multi-point to point transmission, all the de-compression blocks 70a-d can be connected to one common destination point (not shown) so that all the restored Ethernet packets arrive to it. Configuration of such a system will remind that of FIG. 8, in the reverse direction.

Figure 10:
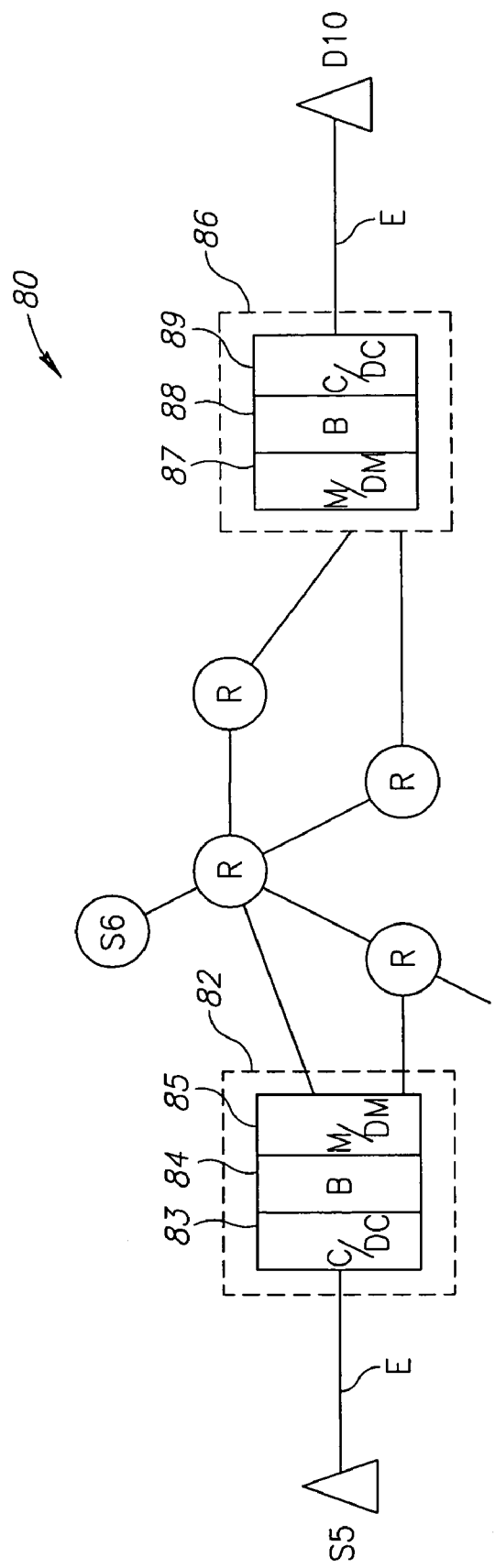
FIG. 10 illustrates an additional example of the system according to the invention.

FIG. 10 illustrates yet another example of mapping Ethernet packets, if transmitted via an MPLS cloud point-to-point. Ethernet packets transmitted from the Ethernet source S5 are received at an intermediate node 82. In this particular embodiment, where a point-to-point transmission is considered, the node 82 comprises a compressing means 83, a buffer 84 with a memory for accumulating a number of shortened information blocks received from block 83, and a mapper 85 which is capable of producing an MPLS packet incorporating in it a number of information blocks received from the buffer 84. The MPLS packets thus produced are provided with a label enabling their delivery via routers R of the MPLS network to an intermediate node 86 interconnected with an Ethernet destination point D10. The node 86 comprises a demapper 87, a buffer 88 for storing the information blocks separated from the MPLS packet, and a de-compression block 89 responsible for restoring the compressed Etherent packets.

The node 82 and/or 86 may be designed to receive/issue a number of incoming MPLS streams say, an additional stream from/to source S6 connected to one of the routers.

It goes without saying that in all the illustrated cases transmission can be performed in both directions (full-duplex transmission), so in the direction opposite to that illustrated the decompression means serves as compression means, and vice versa.

It should also be noted that the multiplexing technology does not have to be associated with a plurality of sources only. A number of shortened information blocks can be produced by a single source in succession and then multiplexed for mapping into a common transmission envelope.

The examples illustrated in FIGS. 8, 9 can be understood as examples of applying other mapping technologies with multiplexing (such as PPP, GFP, as has been mentioned with reference to FIGS. 5 and 6). In such cases the communication links 66, 46, 49, 47, 48 may present transmission technologies other than Ethernet. The example of FIG. 10 can also be used for illustrating an Ethernet layer 2 switch cloud.

It should be appreciated that other variations of the proposed method, device and system may be possible; they are to be considered as part of the invention the scope of which is defined by the following claims.

The invention claimed is:

1. A method of transmitting Ethernet packets from an Ethernet source point to an Ethernet destination point via a pure Ethernet media communication link, the method comprising compressing the packets at an Ethernet layer in such a manner that the source point transmits complete Ethernet packets, the communication link carries shortened information blocks (SIB) obtained from said complete Ethernet packets, while the destination point receives other complete Ethernet packets essentially identical to the complete Ethernet packets transmitted from the source point, wherein said compressing comprises dropping, during one and the same communication session utilizing point to multi point (p-t-mp), multi point to point (mp-t-p) or multi point-to-multi point (mp-t-mp) transmission, pre-defined and/or predictable fields of the complete Ethernet packets, and wherein said pre-defined and/or predictable fields are Ethernet headers SA and DA of the complete Ethernet packet;

said transmission being a full duplex transmission, and said compression being performed in both directions of the transmission, the method further comprising:

transmitting the complete Ethernet packets from the source point according to a standard Ethernet protocol, compressing said complete Ethernet packets according to a compression/decompression procedure at the Ethernet layer, to obtain the SIB, conveying the shortened information blocks via the communication link;

decompressing said shortened information blocks into the other complete Ethernet packets based on said compression/decompression procedure before having the other complete Ethernet packets forwarded to the destination point, receiving at the destination point said other complete Ethernet packets being essentially identical to the respective complete Ethernet packets transmitted from the source point, preliminarily defining one or more compression templates of the Ethernet packet;

at the compressing step, determining one of the compression templates, presently in use for the Ethernet packet;

at the compressing step, determining a compression context ID for the compression template presently in use;

providing information on the compression template and the compression context ID presently in use for the decompressing step;

at the decompressing step, retrieving a compression context corresponding to the compression context ID;

compressing further Ethernet packets according to the compression context ID and decompressing according to the retrieved compression context;

periodically checking the compression template and the compression context ID; if remain the same, continuing the compressed transmission, if not-repeating the preceding operations for a newly determined compression template and/or a new compression context ID.

2. A method according to claim 1, wherein the compression/decompression procedure comprises:

at the step of compressing, dropping said fields of the complete Ethernet packets, upon determining a list and contents of said fields that will be decompressed, thereby obtaining the SIB;

at the step of decompressing, restoring said dropped fields to obtain essentially the complete Ethernet packets from their respective SIB.

3. A method according to claim 1, wherein the compression/decompression procedure comprises dropping said predefined and/or predictable fields of a particular complete Ethernet packet according to a selected compression context and adding an indication concerning the selected compression context to obtain a shortened information block of said particular complete Ethernet packet; said selected compression context being utilized at the step of decompressing for essentially restoring the complete Ethernet packets from said shortened information blocks.

4. The method according to claim 3, further comprising preliminary selecting, from a plurality of various templates, a template corresponding to a particular type of the complete Ethernet packet.

5. The method according to claim 4, further comprising adding indication associated with the selected template to the shortened information block, to allow further restoration of the shortened information block according to the selected template and to the selected compression context.

6. The method according to claim 1, wherein the standard Ethernet protocol is Ethernet layer 1 or layer 2 protocol.

7. The method according to claim 1, further including an operation of mapping said SIB obtained upon said compressing, onto the communication link, and an operation of de-mapping said SIB for de-compressing.

8. The method according to claim 7, wherein the mapping of the SIB is performed by multiplexing a number of said SIB within a common envelope according to a communication protocol utilized at said communication link.

9. A device for compressing/decompressing Ethernet packets, the device comprising a compressor and/or a decompressor, each of said compressor and/or a decompressor having an input side and an output side and being operative:

to handle complete Ethernet packets according to a standard Ethernet protocol at one of the two sides, and to handle shortened information blocks (SIB) at another of its two sides, wherein said SIB are obtained according to a compression/decompression procedure at an Ethernet layer, and comprise portions of said complete Ethernet packets, wherein the compressor being operative, during one and the same communication session, to drop pre-defined and/or predictable fields of a complete Ethernet packet according to the compression/decompression procedure, said fields comprising Ethernet headers SA and DA of the complete Ethernet packets;

and wherein the decompressor is operative, during the one and the same communication session, to restore the pre-defined and/or predictable fields of the complete Ethernet packet according to the compression/decompression procedure, said fields comprising Ethernet headers SA and DA of the complete Ethernet packets, the device being configured for compressing Ethernet packets to be transmitted in the another of the two sides and decompressing Ethernet packets to be transmitted in the one of the two sides, wherein the compressor, in both direction of the full-duplex transmission, is capable of dropping said Ethernet headers SA and DA of the complete Ethernet packets and of transferring said SIB over a communication link, the communication link being an Ethernet media link, the device being further configured to transmit the complete Ethernet packets from the source point according to a standard Ethernet protocol, the compressor being configured to compress said complete Ethernet packets according to a compression/decompression procedure at the Ethernet layer, to obtain the SIB, and convey the shortened information blocks via the communication link;

the decompressor being configured to decompress said shortened information blocks into the other complete Ethernet packets based on said compression/decompression procedure before having the other complete Ethernet packets forwarded to the destination point, the device being further configured to receive, at the destination point, said other complete Ethernet packets being essentially identical to the respective complete Ethernet packets transmitted from the source point, the compressor being further configured to preliminarily define one or more compression templates of the Ethernet packet, determine one of the compression templates, presently in use for the Ethernet packet, determine a compression context ID for the compression template presently in use, and providing information on the compression template and the compression context ID presently in use to the decompressor, the decompressor being further configured to retrieve a compression context corresponding to the compression context ID;

the compressor being further configured to compress further Ethernet packets according to the compression context ID and the decompressor being further configured to decompress said further Ethernet packets according to the retrieved compression context, and the compressor being further configured to periodically check the compression template and the compression context ID, and if the compression template and the compression context ID remain the same, continue the compressed transmission, if not, repeat the preceding operations for a newly determined compression template and/or a new compression context ID.

10. The device according to claim 9, being configured to compress and decompress Ethernet packets to be transmitted in two opposite directions of the full duplex transmission via the communication link between an Ethernet source point and an Ethernet destination point both operating according to the standard Ethernet protocol, according to point to multi point (p-t-mp), multi point to point (mp-t-p) or multi point-to-multi point (mp-t-mp) transmission.

11. A system for transmission of Ethernet packets via a pure Ethernet communication link, the system comprises an Ethernet source point and an Ethernet destination point both operating according to a standard Ethernet protocol and connected via the communication link being a pure Ethernet media link, the system further comprises: a compressor and a decompressor both operative according to a compression/decompression procedure at the Ethernet layer, the compressor is connectable to be in communication with the source point and the communication link and, during one and the same communication session, is capable of producing shortened information blocks (SIB) from the Ethernet packets by dropping pre-defined and/or predictable fields of an Ethernet packet, said fields comprising:

Ethernet headers SA and DA of the Ethernet packets to be transmitted according to point to multi point (p-t-mp), multi point to point (mp-t-p) or multi point-to-multi point (mp-t-mp) transmission;

wherein the decompressor is connectable to be in communication with the communication link and the destination point, and is capable of restoring said Ethernet packets from said SIB, the system being further configured to transmit the complete Ethernet packets from the source point according to a standard Ethernet protocol, the compressor being configured to compress said complete Ethernet packets according to a compression/decompression procedure at the Ethernet layer, to obtain the SIB, and convey the shortened information blocks via the communication link;

the decompressor being configured to decompress said shortened information blocks into the other complete Ethernet packets based on said compression/decompression procedure before having the other complete Ethernet packets forwarded to the destination point, the system being further configured to receive, at the destination point, said other complete Ethernet packets being essentially identical to the respective complete Ethernet packets transmitted from the source point, the compressor being further configured to preliminarily define one or more compression templates of the Ethernet packet, determine one of the compression templates, presently in use for the Ethernet packet, determine a compression context ID for the compression template presently in use, and providing information on the compression template and the compression context ID presently in use to the decompressor, the decompressor being further configured to retrieve a compression context corresponding to the compression context ID;

the compressor being further configured to compress further Ethernet packets according to the compression context ID and the decompressor being further configured to decompress said further Ethernet packets according to the retrieved compression context, and the compressor being further configured to periodically check the compression template and the compression context ID, and if the compression template and the compression context ID remain the same, continue the compressed transmission, if not, repeat the preceding operations for a newly determined compression template and/or a new compression context ID.

12. The system according to claim 11, further comprising a mapper connectable between the compressor and the communication link, and a de-mapper connectable between the communication link and the decompressor.

13. The system according to claim 12, wherein said communication link is in a network of not lower than layer 2, and wherein the mapping means is capable of performing multiplexing of the shortened information blocks SIB within one common envelope according to a communication protocol utilized at said communication link.

14. The system according to claim 11, adapted for full-duplex transmission, wherein the compressor is capable of dropping the Ethernet headers SA and DA of said Ethernet packets in both directions of the full-duplex transmission.

* * * * *